Mar. 3, 1925.
1,527,978
W. HILDEBRAND
APPARATUS FOR INCREASING THE BRAKE POWER OF THE KUNZE KNORR BRAKE
Filed Aug. 13, 1924
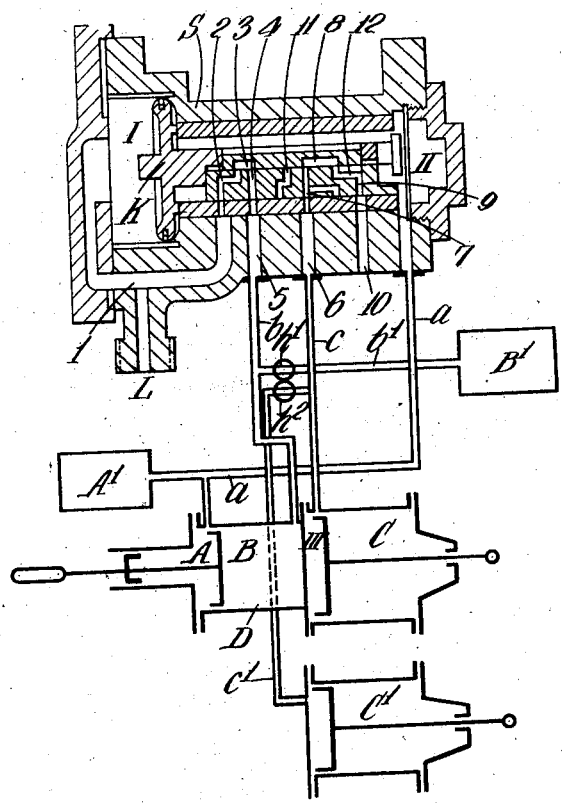
Inventor
Wilhelm Hildebrand
By Pennie, Davis, Marvin & Edmonds
Attorneys Patented Mar. 3, 1925.

1,527,978

UNITED STATES PATENT OFFICE.

WILHELM HILDEBRAND, OF LICHTERFELDE, BERLIN, GERMANY, ASSIGNOR TO HANDEL MAATSCHAPPIJ H. ALBERT DE BARY & CO., OF AMSTERDAM, NETHERLANDS, A DUTCH COMPANY.

APPARATUS FOR INCREASING THE BRAKE POWER OF THE KUNZE KNORR BRAKE.

Application filed August 13, 1924. Serial No. 731,700.

*To all whom it may concern:*

Be it known that I, WILHELM HILDEBRAND, a citizen of the German Republic, residing at 3 Ulmenplatz, Lichterfelde, Berlin, Germany, have invented certain new and useful Improvements in Apparatus for Increasing the Brake Power of the Kunze Knorr Brake, of which the following is a specification.

Whereas in passenger carriages the weight of the passengers is so small compared with the weight of the vehicles themselves that the total weight of the passenger carriages may be regarded as practically invariable, in the case of goods waggons the total weight varies to a very great extent, because both the nature and the amount of the load carried by goods waggons varies continually. In view of this, brake engineers have endeavoured from the very first since the air brake has been applied to goods trains to adapt the power of the brake as much as possible to the very variable total weight of the goods waggons. So far as the use of the simple single chamber brake was concerned, after a few experiments made with the object of varying the power of the brake by varying the ratio of transmission of the levers, these endeavours soon led to the employment, for the purpose of braking the effective weight, of a second or additional brake cylinder, in which the action of the brake can be graded and the release of the brake also graded but only in part and not entirely. In the Kunze Knorr brake which as is well known is provided, in addition to the single chamber brake cylinder in which both the application and release of the brake can be graded, with a duplex chamber brake cylinder which forms the auxiliary reservoir for the single chamber brake cylinder, the duplex chamber has hitherto been used to brake the effective load of the vehicle. Now since, as is well known, the braking action of the single brake cylinder in the Kunze Knorr brake could only be graded upwards and downwards, the co-operation of the duplex chamber brake cylinder for braking the effective load was soon found to be inadequate on account of the impossibility of grading the action of the brake. Regulation of the braking action of the duplex chamber brake cylinder in the same way in which it had already been done in the case of the single chamber brake cylinder was found to be impossible without further modification of the apparatus, on account of the constructional peculiarities of the Kunze Knorr brake, and also owing to the peculiar method of action of the duplex chamber brake cylinder. It became necessary therefore to resort to other means in order to obtain, for the braking of the effective load, a braking force which could be regulated upwards and downwards to a sufficient degree, in addition to the braking force already afforded by the single chamber brake cylinder.

According to the present invention there is provided in the Kunze Knorr brake a second single chamber brake cylinder, which in cases of necessity can be connected up in parallel with the already existing single chamber brake cylinder. At the same time the auxiliary reservoir which supplies the single chamber with compressed air (the dead air chamber of the duplex chamber brake cylinder in the case of the Kunze Knorr brake) must be increased in size. The capacity of the other chamber of the duplex chamber brake cylinder, the so-called working chamber, may on the other hand remain unchanged. At the same time provision must be made to enable this chamber, which is to be enlarged in proportion to the volume of the additional single chamber brake cylinder, to be cut out of circuit when the additional single chamber brake cylinder is automatically connected up with the dead chamber of the duplex brake cylinder. Under these conditions the divided auxiliary air reservoir acts, as in the Kunze Knorr brake with only two cylinders, as a controlling device for the additional single chamber brake cylinder also, so that a second controlling valve is rendered unnecessary and the total braking force can be graded as desired both upwards and downwards from zero to the maximum amount.

The drawing illustrates a constructional form of the subject matter of the invention.

S is the normal controlling valve of the Kunze Knorr brake. D is the normal brake apparatus corresponding thereto, which combines in itself the duplex chamber cylinder AB and the single chamber cylinder C.

The reservoir $A^1$ forms in the well known way the enlarged portion of the chamber A of the duplex chamber cylinder. This chamber is connected by the pipe $a$ to the slide valve chest H of the controlling valve S, while the chamber I on the other side of the controlling piston communicates at L with the train pipe. A reservoir $B^1$ may be connected by a cock $h^1$ and a pipe $b^1$ to the pipe $b$ which leads from the controlling valve S to the chamber B of the duplex chamber cylinder. The pipe $c$ which leads from the controlling valve to chamber III of the single chamber brake cylinder C is also connected by the cock $h^2$ and the pipe $c^1$ to an additional or supplementary brake cylinder $C^1$. The levers which operate the cocks $h^1$ and $h^2$ may either be connected positively to each other or may also be combined in a single cock in the well known way.

The apparatus works as follows: When the cocks $h^1$ and $h^2$ are closed, the controlling valve S co-operates in the well known way with the brake apparatus D. When the brakes are released the compressed air passes from the branch L into the chamber I and drives the controlling piston towards the right. In the position of the two controlling valves thus brought about (shown in the drawing) the air passes out of the pipe L through the ports 1, 2, 3, 4 and 5 and the pipe $b$ into the chamber B of the duplex chamber cylinder, and its piston is driven towards the left. The compressed air then passes on over the piston into the chambers A and $A^1$ and thence through the pipe $a$ also into the chamber II of the controlling valve. During this time the air is discharged from the chamber III of the single chamber cylinder C through the pipe $c$ and the ports 6, 7, 8, 9 and 10. If air be allowed to escape from the pipe L for the purpose of applying the brakes, the controlling piston $k$ moves towards the left and by means of the valve which it operates connects the chamber B of the duplex chamber cylinder with the chamber III of the single chamber cylinder C by means of the pipe $b$, the ports 5, 11, 8, 12, 6 and the pipe $c$. The available graduation is here that of the well known Kunze Knorr brake.

Supposing now that the braking force is to be adapted to the weight of the load and augmented, the double cock $h^1$ and $h^2$ is so operated that the brake cylinder $C^1$ is put into communication with the brake cylinder C by the pipes $c^1$ and $c$, and the reservoir $B^1$ into communication with the chamber B of the duplex chamber cylinder by the pipes $b^1$ and $b$. The result of this is that when the brakes are released the compressed air passes out of the pipe not only into the chamber B, but into the chamber $B^1$ also, so that a corresponding augmentation of the chamber B is produced. The discharge of the air from the brake cylinder C is also accompanied simultaneously by a discharge of air from the brake cylinder $C^1$. If air be allowed to escape from the pipes for the purpose of initiating an application of the brakes, the compressed air passes out of the two chambers B and $B^1$ across the controlling valve into the two brake cylinders C and $C^1$, so that both brake cylinders act together. As the capacity of the reservoir $B^1$ is of such dimensions in comparison with that of the brake cylinder $C^1$ that the equalizing pressure between the chambers B and $B^1$ and the cylinders C and $C^1$ is the same as it is between the chambers B and the brake cylinder C alone, the piston of the duplex chamber cylinder assumes exactly the same positions when the action of the brake is graded as it does in the single brake apparatus. The consequences is that the pressure in the chamber A also increases and decreases in the same way, and the regulation of the pressure of the brake is therefore exactly the same both for loaded and empty vehicles. In this case the power of regulation extends beyond the total action of the brake that is to say it extends to the equalization of the pressure between the chambers B and $B^1$ and the brake cylinders C and $C^1$.

What I claim and desire to secure by Letters Patent of the United States is:—

Apparatus for increasing the brake-power in the Kunze Knorr brake for breaking the weight of the load, characterized by the fact that a second single chamber cylinder (or several such cylinders if necessary) is connected to the normal single chamber cylinder and the dead space of the duplex chamber cylinder so augmented by connecting up one or more reservoirs therewith that the equalizing pressure of all the single chamber cylinders together with the correspondingly augmented dead space of the duplex chamber cylinder is the same as it is in the single brake apparatus for braking the weight of empty vehicles.

WILHELM HILDEBRAND.